United States Patent
Ho (10) Patent No.: US 7,990,811 B2
(45) Date of Patent: Aug. 2, 2011

(54) TRAY CONTROLLING METHOD USING FIRMWARE FOR DETECTING DIFFERENT INCLINED POSITION

(75) Inventor: Chun-Lung Ho, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 12/879,091

(22) Filed: Sep. 10, 2010

(65) Prior Publication Data

US 2011/0004890 A1 Jan. 6, 2011

Related U.S. Application Data

(62) Division of application No. 12/345,057, filed on Dec. 29, 2008, now Pat. No. 7,817,503.

(30) Foreign Application Priority Data

May 21, 2008 (CN) .......................... 2008 1 0107913

(51) Int. Cl.
*G11B 21/08* (2006.01)
(52) U.S. Cl. ..................... 369/30.27; 720/601
(58) Field of Classification Search ............... 369/30.27, 369/30.26, 33.01, 30.1–30.17; 720/601, 720/602, 606, 617, 619, 659, 661, 695
See application file for complete search history.

(56) References Cited

U.S. PATENT DOCUMENTS

| | | | |
|---|---|---|---|
| 5,210,725 A | 5/1993 | Kase et al. | |
| 5,511,056 A * | 4/1996 | Choi | 720/601 |
| 5,699,338 A | 12/1997 | Leung | |
| 5,802,021 A * | 9/1998 | Mukaida | 369/30.32 |
| 6,256,278 B1 | 7/2001 | Furukawa et al. | |
| 6,262,961 B1 | 7/2001 | Maeda et al. | |
| 6,345,027 B1 * | 2/2002 | Saji et al. | 720/607 |
| 6,496,464 B1 | 12/2002 | Yamauchi et al. | |
| 6,922,378 B2 | 7/2005 | Shen | |
| 7,055,157 B2 * | 5/2006 | Son | 720/606 |
| 7,266,053 B2 | 9/2007 | Lee et al. | |
| 7,434,240 B2 | 10/2008 | Yoo et al. | |
| 7,505,375 B2 | 3/2009 | Hsu et al. | |
| 7,652,956 B2 * | 1/2010 | Yamada et al. | 369/30.32 |
| 2004/0139453 A1 | 7/2004 | Nakamura et al. | |
| 2005/0259533 A1 | 11/2005 | Sakagami | |
| 2007/0211580 A1 | 9/2007 | Ko | |

* cited by examiner

*Primary Examiner* — Tan X Dinh
(74) *Attorney, Agent, or Firm* — Thomas, Kayden, Horstemeyer & Risley, LLP (57) ABSTRACT

A tray control method for a disk drive including a tray for carrying a disk, a detect switch movable to different inclined positions for detecting different positions of the tray during tray ejection operation, a firmware for receiving signals transmitted by the detect switch upon reaching the different inclined positions. The voltage applied to the DC motor for moving the tray is lowered after receiving the first signal for a specific time.

3 Claims, 12 Drawing Sheets

TRAY CONTROLLING METHOD USING FIRMWARE FOR DETECTING DIFFERENT INCLINED POSITION

CROSS-REFERENCE TO RELATED APPLICATIONS

This application is a divisional of U.S. application Ser. No. 12/345,057, filed Dec. 29, 2008, now U.S. Pat. No. 7,817,503, and entitled TRAY CONTROLLING METHOD USING MULTIPLE DIFFERENT VOLTAGES, the entire contents of which are incorporated herein by reference.

BACKGROUND OF THE INVENTION

1. Field of the Invention

The invention relates to a tray control method, and more particularly to a method for controlling tray ejection and retraction operations in a disk drive.

2. Description of the Related Art

Lately, as the electronic technology advances, optical disks are welcome more and more due to its compact size, high storage capacity and long preserving time for data. Prevalence of the optical disk raises the disk drive to a high demand commodity in the electronic market.

A conventional disk drive generally includes a tray for carrying a disk and a DC motor for moving the tray to the retracted and ejected positions via a gear mechanism, thereby facilitating placing the disk on the tray or removing the disk from the tray. The output force of the DC motor for moving the tray depends on the applied voltage and the voltage level is generally controlled by the firmware of the disk drive.

In general, the force and speed for moving the tray to the retracted and ejected positions depend on the applied voltage to the DC motor and further on the structural connection between the tray and the other interior mechanism, such as a traverse module, clamping mechanism and etc.

In the prior art technology, the engineers at the production factory use try-and-error method to adjust the voltage applied to the DC motor in order to provide stable vibration of the tray during the tray retraction and tray ejection operations in the disk drive. However, in the mass production line, it is relatively difficult to use try-and-error method on each of the disk drives, thereby failing to maintain the structural connection between the tray and the other interior mechanism at the desired position, which, in turn, results in problems.

For instance, when the structural connection between the tray and the other interior components is loose, the force and speed for moving the tray to the retracted and ejected positions is relatively great, which may cause impact between the tray and the interior components, thereby shortening the service life of the disk drive or dropping the disk from the tray at the ejected position. When the structural connection between the tray and the other interior components is tight, the force and speed for moving the tray to the retracted and ejected positions is relatively small, which, in turn, will prolong the retracting and ejecting time for the tray. The result fails to meet the requirement specification of clients.

In the prior art technology, depending on presence or absence of the disk on the tray, the firmware of the disk drive adjusts the voltage applied to the DC motor, thereby altering the output force of the DC motor for moving the tray.

When there is no disk on the tray, the clamping mechanism is located closely to the holding seat so that relatively strong attraction is existed among the interior components. A large force is required to space the components apart or else the tray ejection operation cannot be performed.

When the disk is disposed on the tray, the output force of the DC motor is required to be adjusted appropriately prior to the tray reaching the ejected position. Otherwise, the impact of the tray against the outer casing upon reaching the ejected position will cause dropping the disk from the tray.

Due to the aforesaid reasons, the firmware of the retract-and-eject system in the disk drive plays an important role for determining whether the disk is present or absent from the tray. For instance, the disk is present on the tray but the firmware determines that the disk is absent from the tray, the output force of the DC motor is too large and may drive the tray at an undesired high speed that the disk may drop from the tray during the tray ejection operation. On the other hand, in case the disk is absent from the tray, however the firmware determines that the disk is on the tray, the output force of the DC motor for moving the tray is too small to separate the clamping mechanism from the holding seat so that the tray ejection operation cannot be performed.

SUMMARY OF THE INVENTION

The first object of the present invention is to provide a tray control method, in which, a detect switch transmits a signal based on the position of the tray so as to control the force and speed for moving the tray during the tray retraction and ejection operations. By altering the voltage applied to the DC motor so as to control different output forces for moving the tray from one position to the other such that the tray slides stably during the tray retraction and ejection operations.

The other object of the present invention is to provide a tray control method, in which, different signal is transmitted by the detect switch when the detect switch is shifted to different inclined positions based on movement of the tray along a Z-shaped guiding channel in an up-down plate so as to adjust the firmware. Thus, the firmware can determine whether the disk is present on the tray or not before the tray reaching a fully retraction position.

The tray ejection control method of the present invention is implemented in a disk drive that includes a tray for carrying a disk, a detect switch, a DC motor and a firmware.

For tray ejection operation in the disk drive, a voltage is applied to the DC motor to move the tray in sequence through a first position, a second position, a third position to a fourth position meanwhile the detect switch is correspondingly shifted in sequence through a first inclined position, a second inclined position, a third inclined position to a fourth inclined position.

When the detect switch is shifted to the second inclined position, a first signal is transmitted to the firmware. When the detect switch is shifted to the third inclined position, a second signal is transmitted to the firmware. In this embodiment, in order to control the force at the initial stage of the tray ejection operation and the tray ejection time, the following steps are conducted, that is:

supplying a first voltage for moving the tray during a first application time;

raising the first voltage to a second voltage in order to move the tray when the first application time is elapsed and the first signal is not transmitted;

maintaining the second voltage during a second application time; and receiving the first signal, wherein a total amount of the first and second application time is less than or equal to a predetermined time.

In other embodiment, the tray ejection control method of the present invention includes the following steps:

setting a first reference time and a second reference time, wherein the second reference time is greater than the first reference time;

calculating a time difference between a first interval time from beginning ejection of the tray till the second signal is transmitted and a second interval time from beginning ejection of the tray till the first signal is transmitted when the second signal is transmitted; and adjusting a voltage applied to a DC motor based on the time difference between the first and second interval time.

In another embodiment, the tray ejection control method of the present invention includes the following steps:

moving the tray from a first position to a second position by applying a voltage to a DC motor;

receiving a first signal;

maintaining the voltage applied to the DC motor for a specific time after receiving the first signal;

lowering the voltage; and moving the tray to the fourth position.

After the first signal is received and when the specific time is elapsed, the voltage for moving the tray is lowered by the firmware before reaching the fourth position (fully ejected position) so as to avoid an impact caused thereby.

A method for controlling tray retraction is provided according to the present invention and is implemented in a disk drive that includes a tray for carrying a disk, a detect switch, a DC motor, a firmware and a traverse module.

A voltage is applied to the DC motor to move the tray in sequence through a fourth position, a third position, a second position to a first position meanwhile the detect switch is correspondingly shifted in sequence through a fourth inclined position, a third inclined position, a second inclined position to a first inclined position.

When the detect switch is shifted to the third inclined position, a third signal is transmitted to the firmware. When the detect switch is shifted to the second inclined position, a fourth signal is transmitted to the firmware. The tray retraction control method includes the following steps:

moving the tray from the fourth position to the third position, wherein the traverse module is disposed at a lower position;

receiving the third signal;

moving the tray from the third position to the second position, wherein the traverse module is raised from the lower position to an upper position;

receiving the fourth signal;

determining whether the disk is present on the tray or not; and moving the tray from the second position to the first position.

When the tray is moved from the second position to the first position, the traverse module is disposed at the upper position. In other words, the traverse module is retained at the upper position during movement of the tray from the second position to the first position.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
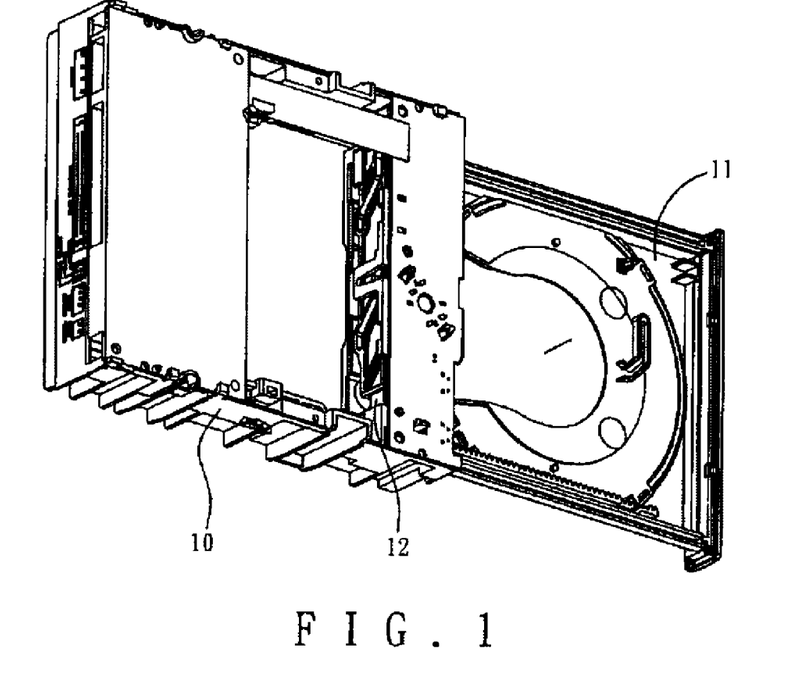
FIG. 1 is a schematic view illustrating relationship among a tray, an up-down plate and other mechanism in a disk drive.
Figure 2:
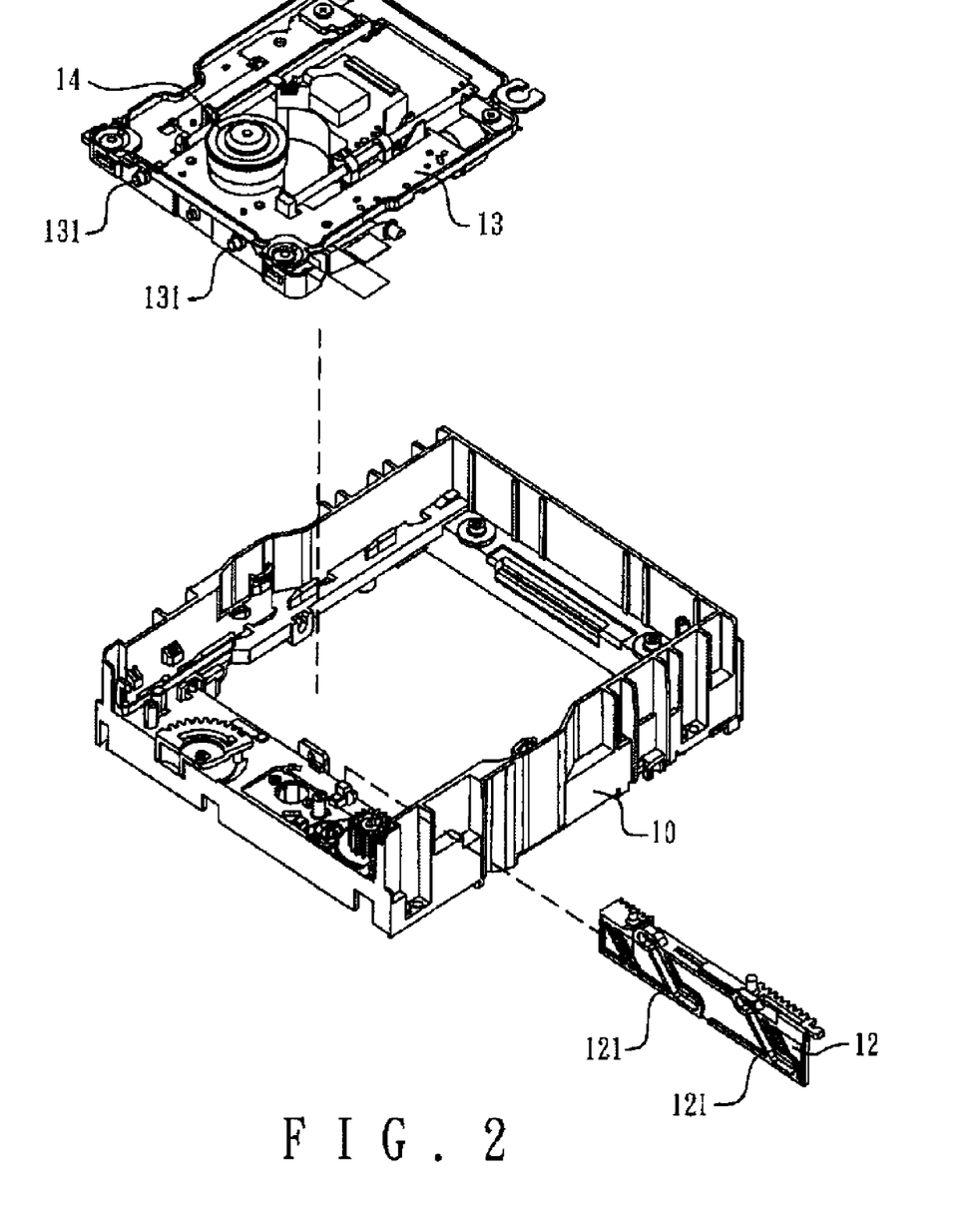
FIG. 2 is an exploded view illustrating an outer casing, a traverse module and an up-down plate in the disk drive.
Figure 3:
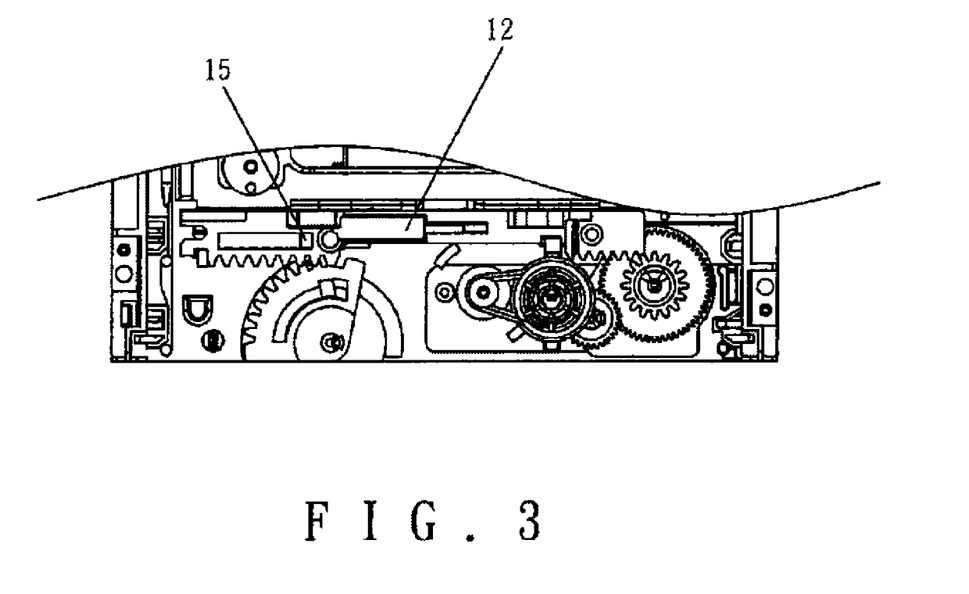
FIG. 3 shows a top fragmentary view illustrating interior components of the disk drive.

FIGS. 1 to 2 respectively illustrates interior components of disk drives available in the market of today. FIG. 3 shows interior components within an outer casing of the disk drive.

As illustrated in FIG. 1, the disk drive generally includes a tray 11 for carrying a disk, an up-down plate 12 connected operationally to the tray 11 via rack-and-pinion mechanism (not shown) and a DC motor for driving the tray 11. Activation of the DC motor causes movements of the tray 11 to the retracted and ejected positions, which, in turn, results in reciprocal movement of the up-down plate 12 to left-and-right sides along a horizontal direction.

As shown in FIG. 2, the disk drive further includes an outer casing 10 receiving a traverse module 13 and the up-down plate 12, wherein the up-down plate is mounted in front of the traverse module 13.

The traverse module 13 has two guide rods 131 extending respectively and being slid into two Z-shaped sliding channels 121 in the up-down plate 12. Movement of the up-down plate 12 along the horizontal direction results in sliding action of the guide rods 131 in the Z-shaped sliding channels 121, thereby raising or lowering the traverse module 13 to upper or lower positions.

When the traverse module 13 is raised to the upper position, a rotating seat 14 located above the traverse module 13 retains the disk (not shown) stably thereon. The disk drive further includes a clamping mechanism opposite to the rotating seat 14, wherein the disk is retained stably between the rotating seat 14 and the clamping mechanism. Since the rotating seat 14 and the clamping mechanism both have magnetic members, a magnetic attraction is present therebetween to retain the disk more stably.

FIG. 3 shows a top fragmentary view of the disk drive of the present invention, wherein the disk drive further includes a detect switch 15 connected operationally to the tray 11 via a linkage mechanism so that the detect switch 15 is shifted to different inclined positions to detect relative positions of the tray 11 during the tray retraction operation and tray ejection operation.

FIGS. 4A to 4D respectively shows relative positions of the guide rods 131 of the traverse module 13 within the Z-shaped sliding channels 121 in the up-down plate 12 during the tray ejection operation and the tray retraction operation and corresponding inclined position of the detect switch 15.

Figure 4A:
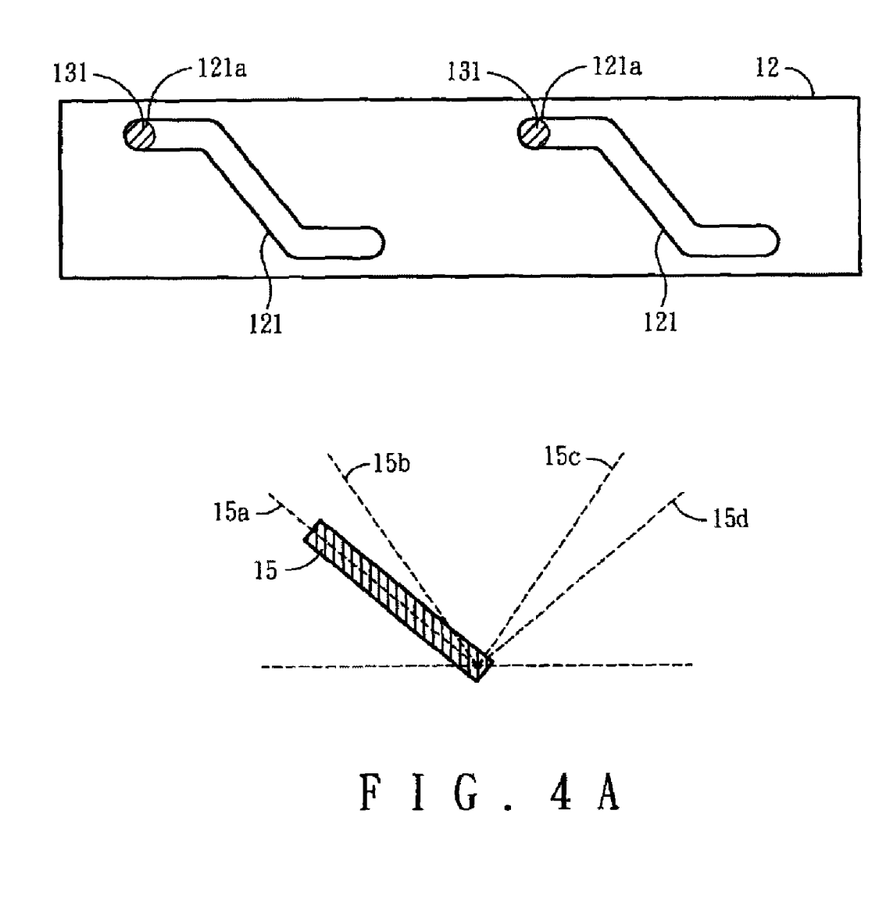
FIGS. 4A to 4D respectively shows relationship and positions among a traverse module, the up-down plate and a detect switch in a disk drive of the present invention.

FIG. 4A illustrates relative position of the corresponding mechanism when the tray 11 is at a first position (fully retracted position). When the tray 11 is moved to the first position, the guide rods 131 of the traverse module 13 are located at the leftmost side 121a of the upper straight section of the Z-shaped sliding channels 121 in the up-down plate 12. At this time, the traverse module 13 is retained at an upper position while the detect switch 15 is shifted to a first inclined position 15a. The first position indicates that the tray 11 is retracted fully within the disk drive.

Figure 4B:
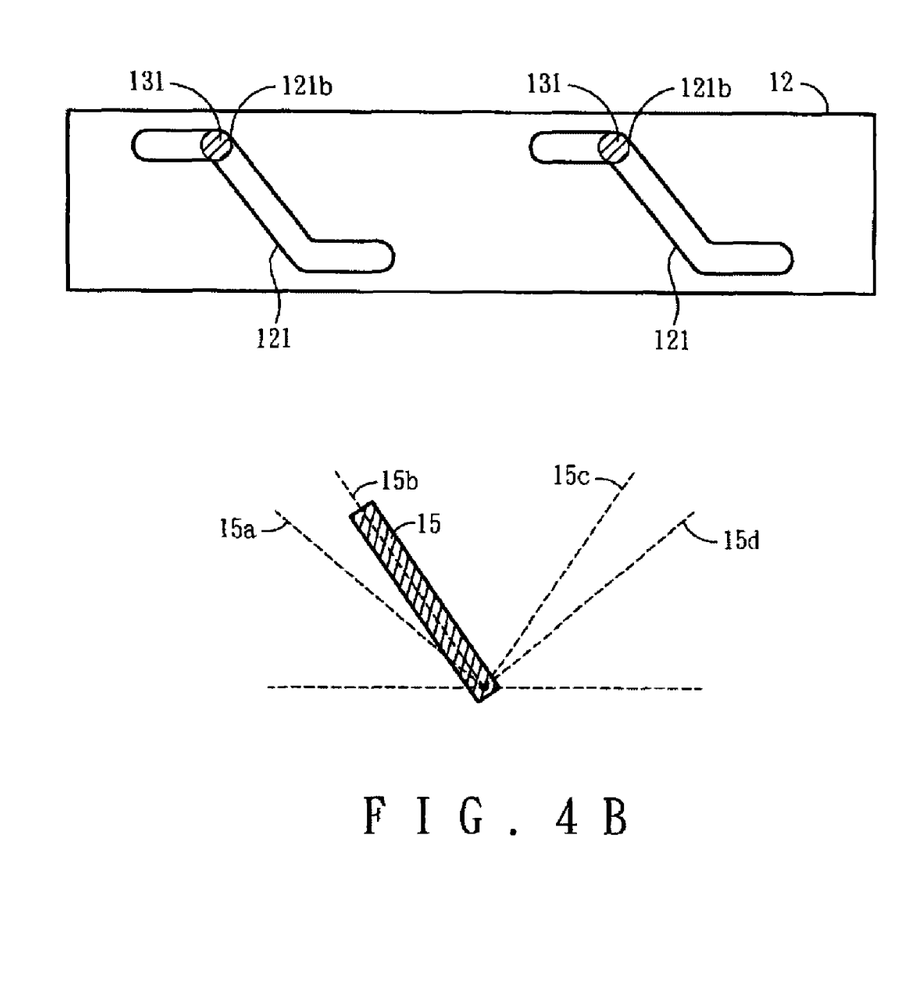

Referring to FIG. 4B, when the tray 11 is moved to a second position from the first position during the tray ejection operation, the up-down plate 12 moves to the left side of the casing along the horizontal direction, thereby moving the guide rods 131 of the traverse module 13 to the rightmost side 121b of the upper straight section of the Z-shaped sliding channels 121 in the up-down plate 12. At this time, the traverse module 13 is retained at the upper position while the detect switch 15 is shifted from the first inclined position 15a to a second inclined position 15b. The second position is close to the fully retracted position.

Figure 4C:
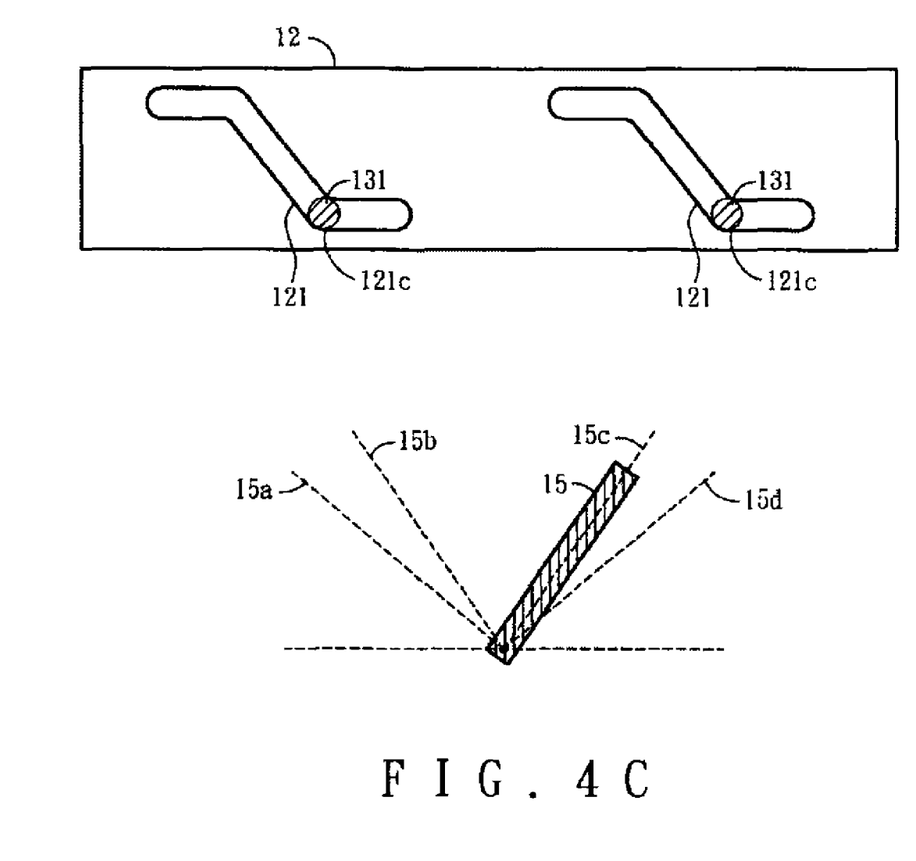

Referring to FIG. 4C, when the tray 11 is moved to a third position from the second position during the tray ejection operation, the up-down plate 12 moves further to the left side, thereby pushing the guide rods 131 of the traverse module 13 from the rightmost side 121b of the upper straight section of the Z-shaped sliding channels 121 downward along the inclined section of the Z-shaped sliding channels 121 to the leftmost side 121c of the lower straight section of the Z-shaped sliding channels 121. At this time, the traverse module 13 is consequently moved from the upper position to a lower position while the detect switch 15 is shifted from the second inclined position 15b to a third inclined position 15c. The third position is close to the fully ejected position.

Figure 4D:
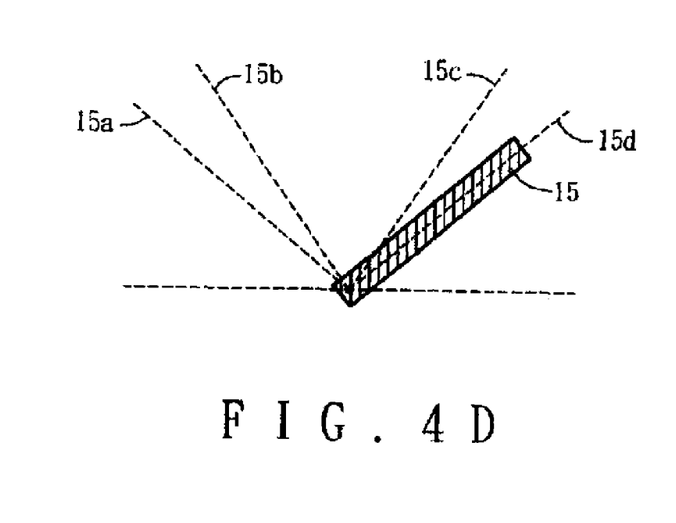

Referring to FIG. 4D, when the tray 11 is further moved to a fourth position during the tray ejection operation, the up-down plate 12 moves further to the left side along the horizontal direction, thereby moving the guide rods 131 from the leftmost side 121c of the lower straight section of the Z-shaped sliding channels 121 to the rightmost side 121d of the lower straight section. At this time, the traverse module 13 is retained at the lower position while the detect switch 15 is shifted from the third inclined position 15c to a fourth inclined position 15d. The fourth position indicates that the tray 11 is ejected fully outward from the disk drive while the third position is close to the fourth position.

The aforementioned FIGS. 4A to 4D respectively shows the steps, structural connection and relative positions among the traverse module 13, the up-down plate 12 and the detect switch 15 during the tray ejection operation of the disk drive. In the same manner, FIGS. 4D to 4A respectively shows the steps, structural connection and relative positions among the traverse module 13, the up-down plate 12 and the detect switch 15 during the tray retraction operation of the disk drive.

During shifting the detect switch 15 from the first inclined position 15a to the second inclined position 15b, the detect switch 15 is maintained at the switch-on state. A first signal is transmitted to the firmware when the detect switch 15 is disposed at the second inclined position 15b. The first signal is a switch-off signal. During shifting the detect switch 15 from the second inclined position 15b to the third inclined position 15c, the detect switch 15 is maintained at the switch-off state. A second signal is transmitted to the firmware when the detect switch 15 is disposed at the third inclined position 15c. The second signal is the switch-on signal. During shifting the detect switch 15 from the third inclined position 15c to the fourth inclined position 15d, the detect switch 15 is maintained at the switch-on state.

In the same manner, during shifting the detect switch 15 from the fourth inclined position 15d to the third inclined position 15c, the detect switch 15 is maintained at the switch-on state. A third signal is transmitted to the firmware when the detect switch 15 is disposed at the third inclined position 15c. The third signal is a switch-off signal. During shifting the detect switch 15 from the third inclined position 15c to the second inclined position 15b, the detect switch 15 is maintained at the switch-off state. A fourth signal is transmitted to the firmware when the detect switch 15 is disposed at the second inclined position 15b. The fourth signal is the switch-on signal. During shifting the detect switch 15 from the second inclined position 15b to the first inclined position 15a, the detect switch 15 is maintained at the switch-on state.

During the movement of the aforesaid tray 11, transmitting the signals by the detect switch 15 at different inclined positions and movement of the guide rods 131 within the Z-shaped sliding channels 121 in the up-down plate 12 are applied to control the firmware. Thus, the voltage required for applying to the DC motor for moving the tray to different positions can be adjusted properly then the tray ejection and retraction operations are more smooth and steady. A detailed disclosure thereof is given in the following paragraphs.

Summarizing the aforesaid movements of the hardware, for tray ejection operation, the DC motor is applied by a voltage to move the tray in sequence through the first position, the second position, the third position to the fourth position meanwhile the detect switch 15 is correspondingly shifted in sequence through the first inclined position 15a, the second inclined position 15b, the third inclined position 15c to the fourth inclined position 15d.

When the detect switch 15 is shifted from the first position 15a to the second inclined position 15b, a first signal is transmitted to the firmware. When the detect switch 15 is shifted from the second position 15b to the third inclined position 15c, a second signal is transmitted to the firmware, wherein the first signal is a switch-off signal while the second signal is a switch-on signal.

Figure 5:
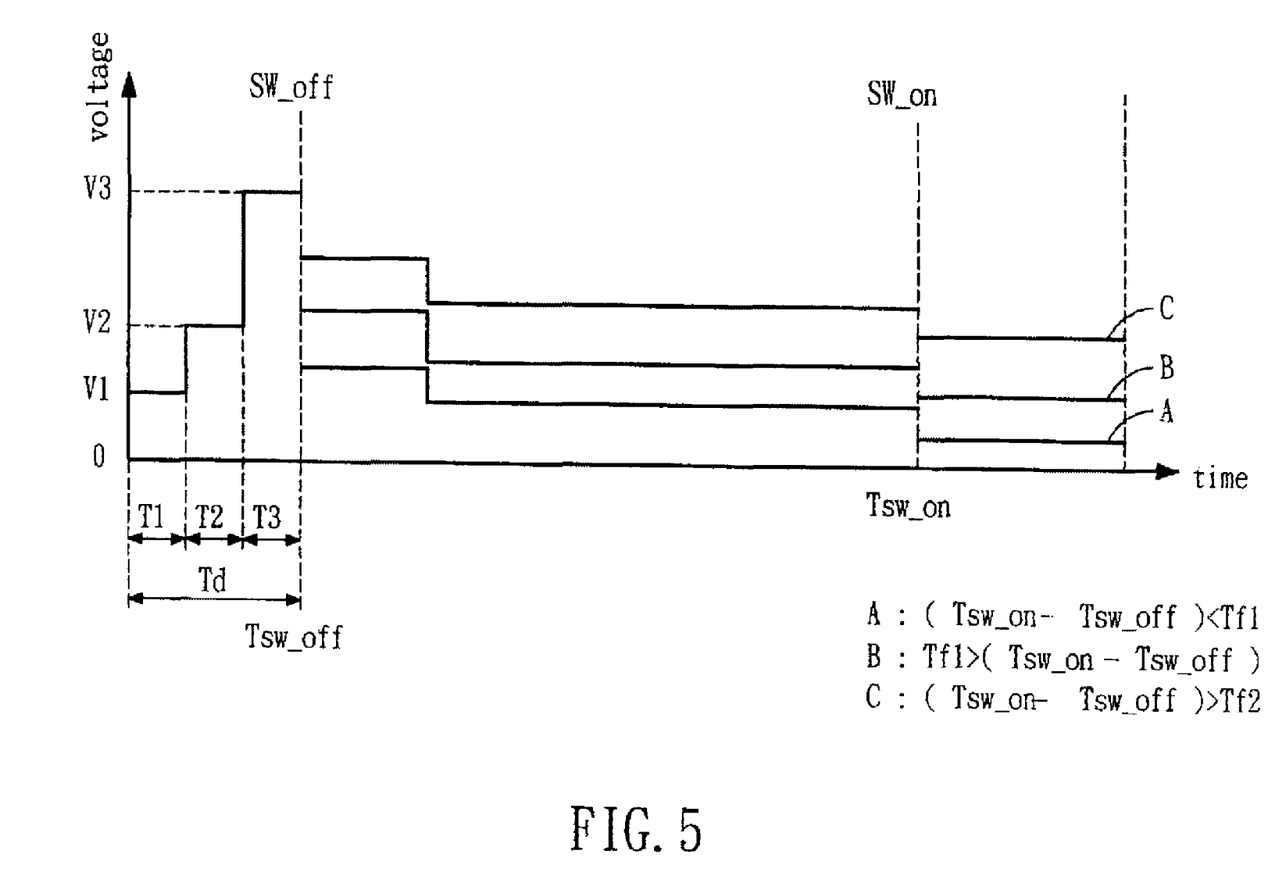
FIG. 5 is a graph representing the voltage applied to a DC motor and the application time during the tray ejection operation in the disk drive of the present invention.
Figure 6:
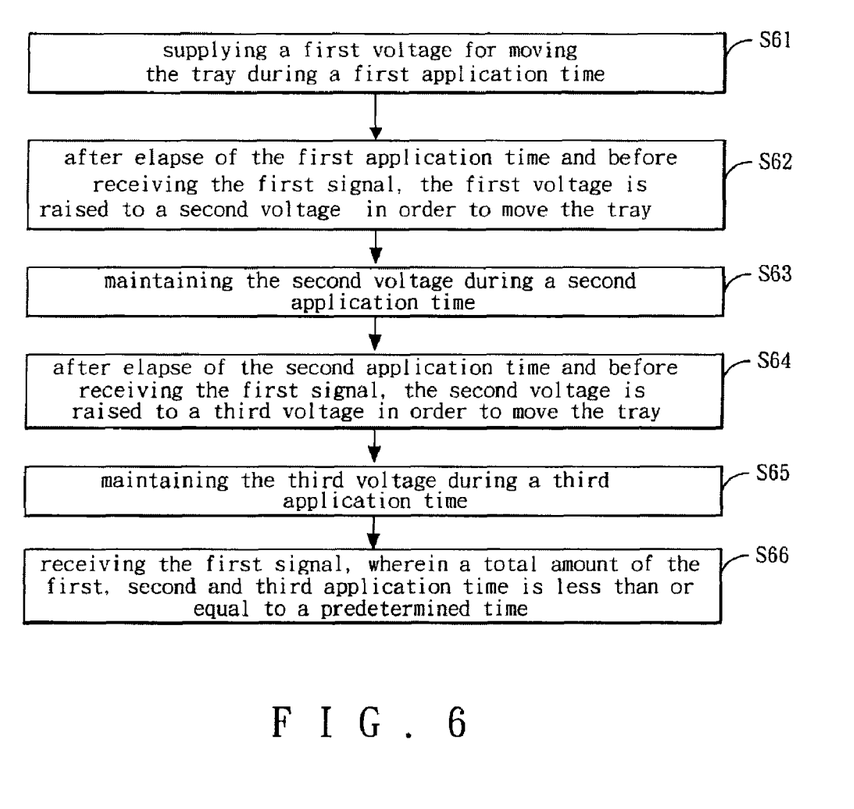
FIG. 6 is a block diagram illustrating the control steps during initial stage of a tray ejection operation in the disk drive of the present invention.

Referring to FIGS. 5 and 6, the method for controlling the voltage level and the application time during the initial stage of the tray ejection operation, includes the following steps.

First, supply a first voltage V1 for moving the tray 11 during a first application time T1 (S61), wherein the tray 11 is moved from the first position (fully retracted position) to the second position.

After elapse the first application time T1 and the first signal is not received, raise the first voltage V1 to a second voltage V2 in order to move the tray 11 (S62). It means that since the components of the disk drive are in tight structural connection, the first voltage V1 applied during the first application time T1 is unable to move the tray 11 to the second position. A larger voltage is required so that the firmware raises the first voltage V1 to the second voltage V2 to move the tray 11. In this step, the firmware alters the first voltage V1 to the second voltage V2.

Then, maintain the second voltage V2 during a second application time T2 (S63).

After elapse the second application time T2, and the first signal is not received, raise the second voltage V2 to a third voltage V3 in order to move the tray 11 (S64). During the second application time T2, the second voltage V2 is unable to move the tray 11 to the second position means that the mechanism of the disk drive are in tight structural connection.

Avoiding the tray ejection operation is too slowly, a larger voltage is required to move the tray 11. In this step, the firmware alters the second voltage V2 to the third voltage V3.

Maintain the third voltage V3 during a third application time T3 (S65).

Later, receive the first signal, wherein a total amount of the first, second and third application time is less than or equal to a predetermined time Td (S66). During this step, the tray 11 is moved to the second position while the detect switch 15 is consequently shifted to the second inclined position 15b and transmits the first signal to the firmware.

Since the structural connection among the components in one disk drive differs from the other disk drive, in other embodiment, maybe only the second voltage V2 is required to move the tray 11 to the second position during the predetermined time Td.

Therefore, in the aforesaid method, during movement of the tray 11 from the first position to the second position, the voltage and the application time are adjusted in order to compensate the tight and loose structural connection among the components, thereby controlling the tray ejection time within the predetermined time. Thus, the tray ejection time does not take too long.

Figure 7:
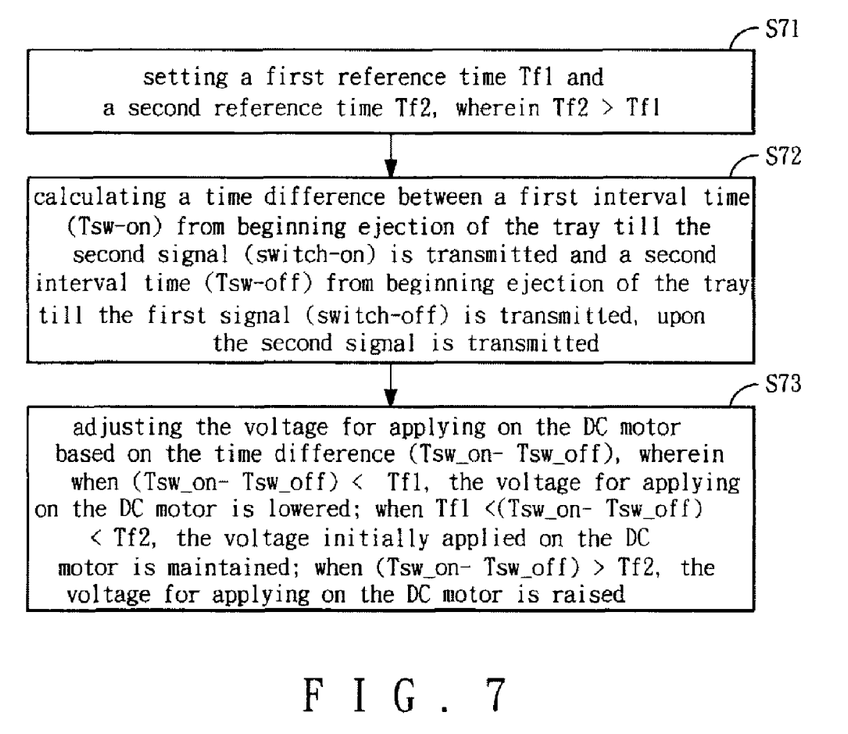
FIG. 7 is a block diagram illustrating the steps for a first control method during the final stage of the tray ejection operation in the disk drive of the present invention.

FIG. 5 is a graph representing the voltage applied to a DC motor and the application time while FIG. 7 is a block diagram illustrating the steps for a first control method during the final stage of the tray ejection operation in the disk drive of the present invention. The first control method includes the following steps.

Set a first reference time Tf1 and a second reference time Tf2, wherein the second reference time Tf2 is greater than the first reference time Tf1 (S71).

Calculate a time difference between a first interval time (Tsw=on) from beginning ejection of the tray till the second signal is transmitted and a second interval time (Tsw-off) from beginning ejection of the tray till the first signal is transmitted when the second signal is transmitted (S72). It is to find out the time difference for moving the tray 11 from the first position to the third position minus the time for moving the tray 11 from the first position to the second position. At this time, the tray 11 is disposed at the third position close to the fourth position (fully ejected position).

Then, adjust the voltage for applying to the DC motor based on the time difference (Tsw-on−Tsw-off) between the first and second interval time (S73).

In case the time difference (Tsw-on−Tsw-off) is smaller than the first reference time (Tf1), it means that the structural connection among the components is rather loose. The firmware will lower the voltage applied to the DC motor, illustrated as line A in FIG. 5. Under this condition, the occurrence of dropping the disk from the tray due to large impact upon reaching the fully ejected position (the fourth position) can be avoided.

In case the time difference (Tsw-on−Tsw-off) falls between the first reference time Tf1 and the second reference time Tf2, it means that the structural connection among the components is normal such that the firmware supplies and maintaining the voltage initially applied on the DC motor, as shown by line B in FIG. 5.

When the time difference (Tsw-on−Tsw-off) is greater than the second reference time Tf2, it means that the structural connection among the components is rather tight such that the firmware raises the voltage applied to the DC motor, as shown in line C in FIG. 5. Thus, the tray ejection time is restricted within the predetermined time.

In the aforesaid method, during movement of the tray 11 from the second position to the third position, the voltage and the application time are adjusted for the second time in order to compensate the tight and loose structural connection among the components, thereby controlling the tray ejection time and the voltage applied to the DC motor. In one embodiment, the steps shown in FIGS. 6 and 7 are combined together to control the tray ejection operation.

Figure 8:
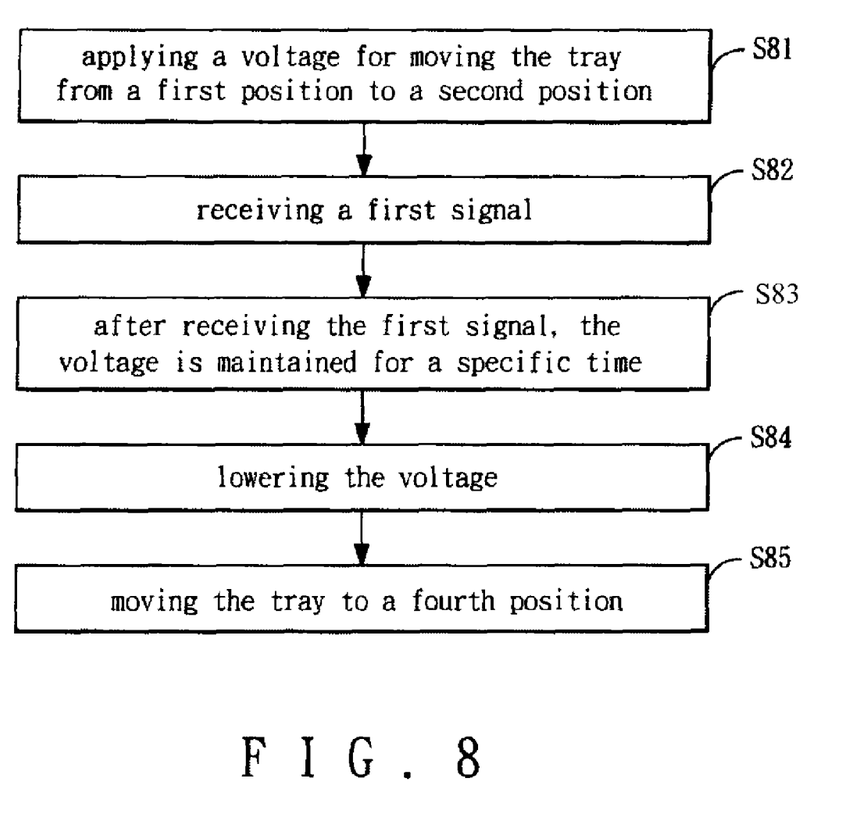
FIG. 8 is a block diagram illustrating the steps for a second control method during the final stage of the tray ejection operation in the disk drive of the present invention.

FIG. 8 is a block diagram illustrating the steps for a second control method of the present invention during the final stage of the tray ejection operation in the disk drive. The second control method differs from the first control method and includes the following steps.

First, move the tray 11 from the first position to the second position by applying a voltage to the DC motor (S81).

Receive the first signal (S82).

Maintain the voltage on the DC motor for a specific time after receiving the first signal (S83).

Lower the voltage (S84).

Move the tray 11 to the fourth position (S85).

It is to say that after receiving the first signal, the voltage is maintained for a specific time, such as for 450 milliseconds. Afterwards, the firmware lowers the voltage applied to the DC motor for moving the tray 11, wherein before the tray 11 reaching the fourth position, the voltage is lowered in order to avoid impact of the tray against the outer casing during the tray ejection operation.

Therefore, in the aforesaid method, it is to slow down the movement of the tray 11 during the final stage of the tray ejection operation in the disk drive. In one embodiment, the steps shown in FIGS. 6 and 8 are combined together to control the tray ejection operation.

Figure 9:
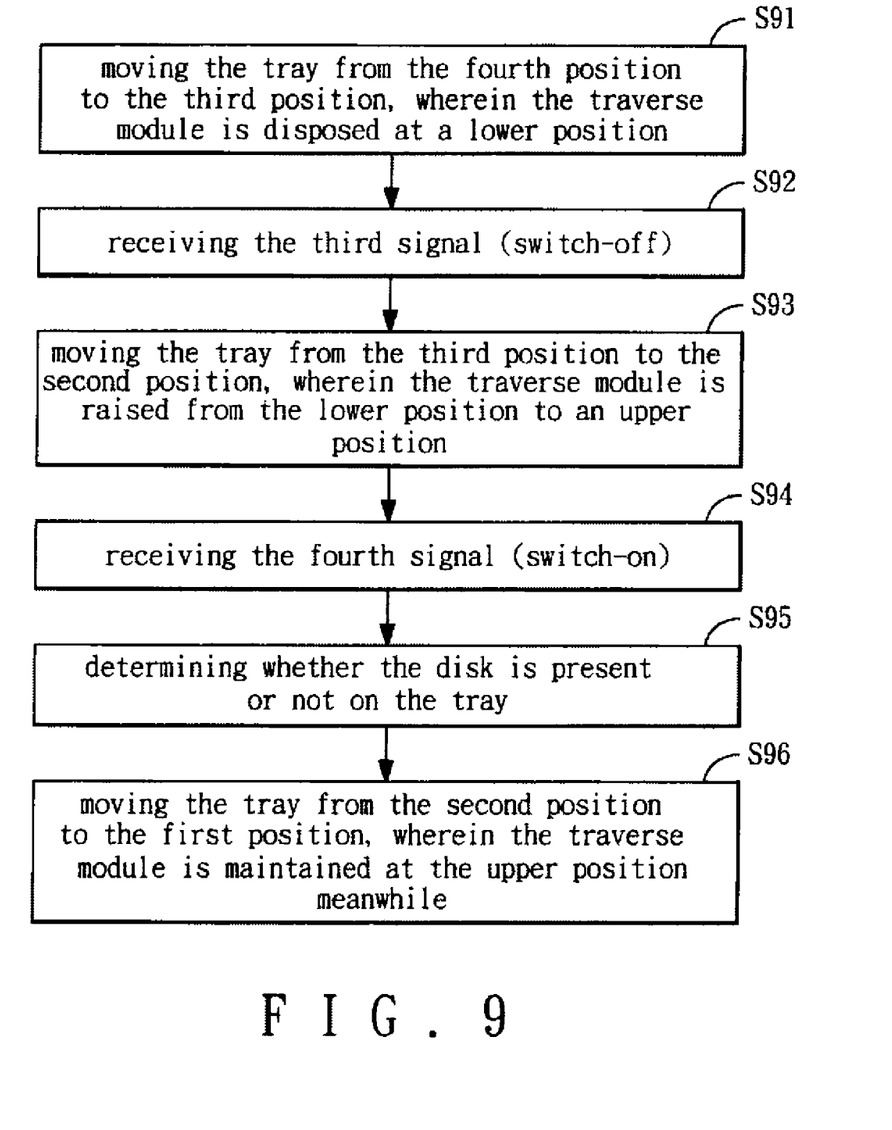
FIG. 9 is a block diagram illustrating the steps for a control method of determining whether a disc is present on the tray or not during the tray retraction operation in the disk drive of the present invention.

FIG. 9 is a block diagram illustrating the steps for a control method of the present invention during the tray retraction operation in the disk drive. For tray retraction operation, the DC motor is applied by a voltage to move the tray 11 in sequence through the fourth position, the third position, the second position to the first position meanwhile the detect switch 15 is correspondingly shifted in sequence through the fourth inclined position 15d, the third inclined position 15c, the second inclined position 15b to the first inclined position 15a.

When the detect switch 15 is shifted to the third inclined position 15c, a third signal is transmitted to the firmware. When the detect switch 15 is shifted to the second inclined position 15b, a fourth signal is transmitted to the firmware. During the tray retraction operation, the third signal is a switch-off signal while the fourth signal is a switch-on signal.

The tray retraction control method accordingly includes the following steps.

Move the tray 11 from the fourth position to the third position, wherein the traverse module 13 is disposed at a lower position (S91). In this step and during movement of the tray 11 from the fourth position to the third position, the up-down plate 12 moves along a horizontal direction to the right side of the outer casing, in which the guide rods 131 are moved from the rightmost side 121d to the leftmost side 121c in the lower straight section of the Z-shaped guiding channels 121 in the up-down plate 12. The traverse module 13 is maintained at the lower position.

Receive the third signal (S92). In this step, when the tray 11 is moved to the third position, the detect switch 15 is correspondingly shifted to the third inclined position 15c while the third signal is transmitted to the firmware.

Move the tray 11 from the third position to the second position, wherein the traverse module 13 is raised from the lower position to an upper position (S93). In this step, movement of the up-down plate 12 to the right side of the outer casing results in raising the guide rods 131 from the leftmost side 121c to the rightmost side 121b of the inclined section of the Z-shaped guiding channels 121 in the up-down plate 12. At this time, the traverse module 13 is raised from the lower position to the upper position.

Receive the fourth signal (S94). In this step, the tray 11 is moved to the second position while the detect switch 15 is accordingly shifted to the second inclined position 15b. The fourth signal is transmitted to the firmware in the disk drive. Then, the firmware determines whether the disk is present on the tray 11 or not (S95). In this step, the firmware further finds out the type of disk and dimension of the disk when receiving the fourth signal. So that the firmware can make an early determination of the disk with respect to the tray 11 prior to the tray 11 reaching the fully retracted position (the first position)

Afterward, move the tray 11 from the second position to the first position, wherein during movement of the tray 11 from the second position to the first position, the traverse module 13 is maintained at the upper position (S96).

In the aforesaid method, before the tray reaching the fully retracted position, the firmware can make an early determination of the disk with respect to the tray so as to avoid the problems (such as forceful collision) caused in the earlier prior art technology.

In addition, by determining the dimension of the loaded disk, the firmware is able to control the voltage applied to the DC motor during the tray ejection. When the loaded disk has a smaller dimension, the applied voltage to the DC motor during the tray ejection is smaller than the larger dimension disk on the tray so that the smaller dimension disk is not dropping from the tray at the fourth position. When the loaded disk has large dimension, the applied voltage is higher than the smaller dimension disk so that the applied voltage is able to move the tray.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for controlling tray ejection of a disk drive that includes a tray for carrying a disk, a detect switch, a DC motor and a firmware, wherein a voltage is applied to the DC motor to move the tray in sequence through a first position, a second position, a third position to a fourth position meanwhile the detect switch is correspondingly shifted in sequence through a first inclined position, a second inclined position, a third inclined position to a fourth inclined position, wherein a first signal is transmitted to the firmware when the detect switch is shifted to the second inclined position, and a second signal is transmitted to the firmware when the detect switch is shifted to the third inclined position, the tray ejection control method comprising the following steps:

moving the tray from the first position to the second position by applying said voltage;

receiving the first signal;

maintaining said voltage applied to the DC motor for a specific time after receiving the first signal;

lowering said voltage; and moving the tray to the fourth position.

2. The tray ejection control method according to claim 1, wherein during the tray ejection of the disk drive, said first signal is a switch-off signal while said second signal is a switch-on signal.

3. The tray ejection control method according to claim 1, wherein said first position indicates that the tray is retracted fully within the disk drive, said fourth position indicates that the tray is ejected fully outward from the disk drive while said third position is close to the fourth position and said second position is close to said third position.

* * * * *